(12) United States Patent
Brown et al.

(10) Patent No.: US 12,489,830 B2
(45) Date of Patent: Dec. 2, 2025

(54) APP-INDEPENDENT RESOURCE DOWNLOADS

(71) Applicant: Apple Inc., Cupertino, CA (US)

(72) Inventors: Eric S. Brown, Los Altos, CA (US);
Jonathan J. Andrews, Los Altos Hills, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/805,461

(22) Filed: Jun. 5, 2022

(65) Prior Publication Data

US 2023/0396695 A1    Dec. 7, 2023

(51) Int. Cl.
*G06F 8/61* (2018.01)
*H04L 67/60* (2022.01)

(52) U.S. Cl.
CPC ............... *H04L 67/60* (2022.05); *G06F 8/61* (2013.01)

(58) Field of Classification Search
CPC ............. G06F 8/61; G06F 8/65; G06F 8/433
See application file for complete search history.

(56) References Cited

U.S. PATENT DOCUMENTS

| | | | |
|---|---|---|---|
| 6,195,678 B1* | 2/2001 | Komuro | G06F 8/61 |
| | | | 709/219 |
| 10,212,563 B2* | 2/2019 | Aleksandrov | H04M 1/72445 |
| 2007/0156856 A1* | 7/2007 | Shafron | G06F 9/454 |
| | | | 709/219 |
| 2016/0357544 A1 | 12/2016 | Lewallen | |
| 2017/0286081 A1* | 10/2017 | Shantharam | G06F 8/61 |
| 2019/0026127 A1* | 1/2019 | Fujii | G06F 9/44505 |
| 2019/0265958 A1* | 8/2019 | Ayers | G06F 21/45 |
| 2023/0025526 A1* | 1/2023 | Grzybek | G06F 8/71 |

* cited by examiner

*Primary Examiner* — Duy Khoung T Nguyen
(74) *Attorney, Agent, or Firm* — Blank Rome LLP

(57) ABSTRACT

Download of a third-party app includes download, to a local device, an installation package for an application, wherein the installation package comprises a resource request component. In response to installing the application, the resource request component is launched. The resource request component causes the local device to transmit a request to a remote device for additional resources for the application, and download the additional resources to the local device.

17 Claims, 6 Drawing Sheets

APP-INDEPENDENT RESOURCE DOWNLOADS

TECHNICAL FIELD

Embodiments described herein relate to a platform for providing software applications. More particularly, embodiments described herein relate to improving app installation by downloading resources independent of the installation package.

BACKGROUND

In recent years, downloading of software applications (or "apps") from an on-line distribution platform, such as an app store, has become a popular method for obtaining software applications. An on-line app store allows users to download a software application onto their device, such as a desktop computer or laptop computer, smartphone, or other mobile device, and then install the app on their device. Prior to downloading an app, users often find apps within the app store.

The online distribution platform may provide apps for download to a local device. However, often times once the apps are downloaded and installed on a local device, the app may still require additional resources before it can be loaded. As an example, many games may require additional resources to be downloaded once the app is installed before the game is operational. As such, the game may not be playable upon installation.

BRIEF DESCRIPTION OF THE DRAWINGS

Embodiments described herein are illustrated by examples and not limitations in the accompanying drawings, in which like references indicate similar features. Furthermore, in the drawings, some conventional details have been omitted, so as not to obscure the inventive concepts described herein.

DETAILED DESCRIPTION

This disclosure pertains to systems, methods, and computer readable media for providing a technique for securely downloading app-independent resources independently of an app installation package. This disclosure also pertains to systems, methods, and compute readable media for downloading resources for an app that are stored remotely separately from an app store.

Developers can provide applications for download on a digital distribution platform, such as an app store. Many third-party applications require additional resources that are not build into and downloaded with the app itself in the app package from the app store. As such, a user may download an application from an app store and install the app. Then, when the user attempts to launch the app, the app will not have all the resources required to run the app. Thus, the user must wait for the app to download the additional content before using the app.

Embodiments described herein provide a technique for enabling resource downloads independent from the download of an app form an app store. By enabling independent resource downloads, developers can ensure that an app will be operable to a user when the user launches the app. Further, similar techniques can be used to enable background updates of apps without user intervention, thereby ensuring that when a user initializes an app, the app will have all the resources it needs to run.

In some embodiments, the techniques for providing independent resource downloads includes developers inserting code into the application which acts as a resource request component. The resource request component can be configured to request, upon download, any additional resources available for the app from remote storage. In some embodiments, the resource request component can monitor the local device for triggering events. Upon detecting a triggering event, the resource request component can send a request to the remote storage. In some embodiments, the requests are managed by resource request API which securely retrieves data from the remote storage. Because the request comes from the remote device, in some embodiments, the resource request component may tailor the resource request based on the device configurations so as to reduce data transmission and storage requirements for the local device.

Figure 1:
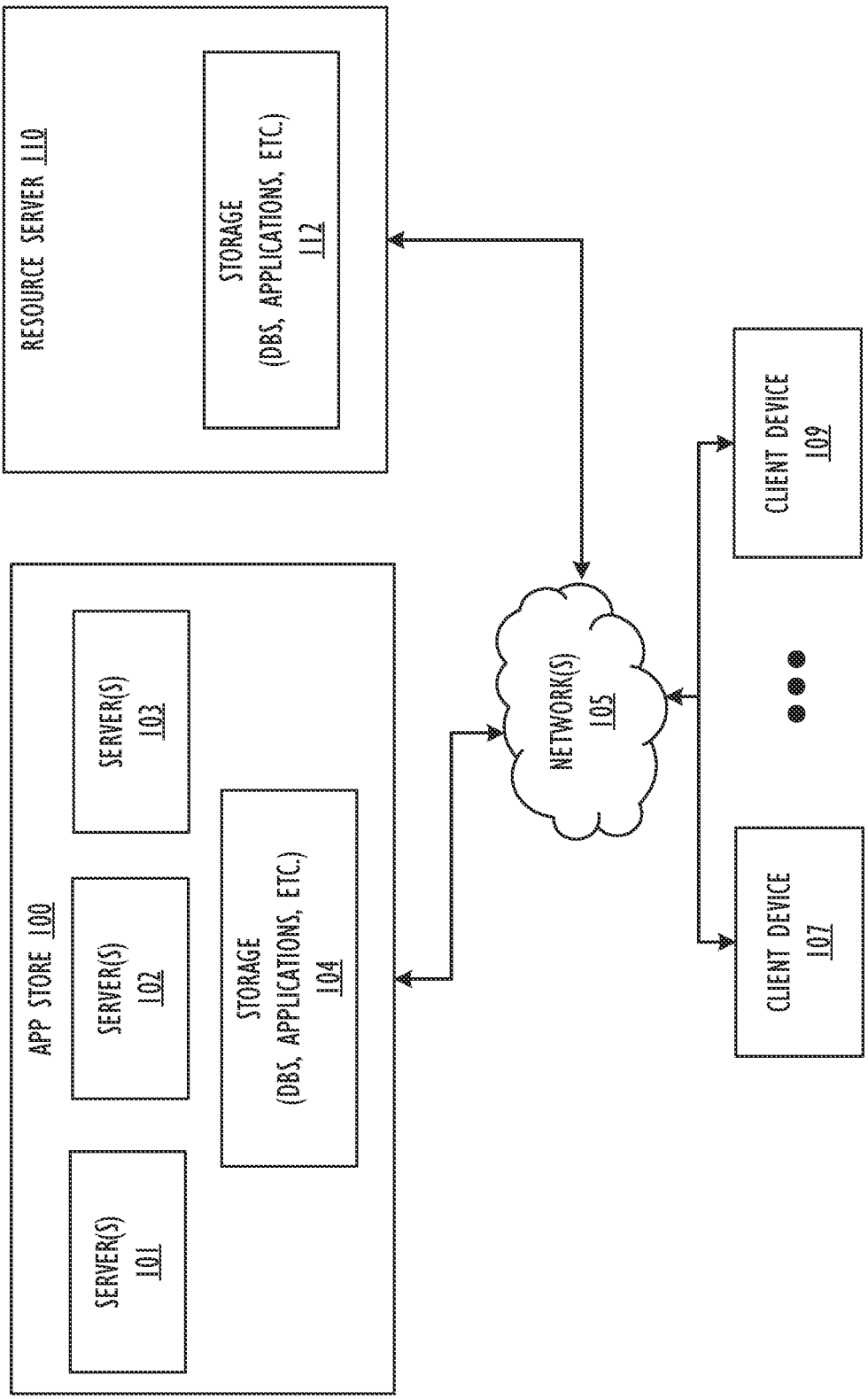
FIG. 1 illustrates, in block diagram form, network by which an app store is accessed by client devices, according to one or more embodiments.

FIG. 1 illustrates, in block diagram form, a network by which an app store is accessed by client devices, according to one or more embodiments. The network diagram includes a digital distribution platform (referred to herein as an app store) 100, communicably connected to client devices 107 and 109 across one or more network(s) 105. In some embodiments, apps hosted on the app store 100 require additional resources separately hosted from the app package, for example on resource server 110.

The embodiments described herein can operate within and interface with the environment and context of an app store from which one or more users, using client devices, can search for and download one or more applications (also referred to as apps). An app store 100 can include one or more servers, such as servers 101, 102, and 103, that can provide the functionality described herein. For example, server(s) 101 can interface with a client device to implement the methods of FIGS. 2 and 3 to generate app interaction data, such as from client devices 107 and 109 which can take a variety of different forms (e.g., tablet computer such as an iPad, smartphone such as an iPhone, laptop computer, desktop computer, network media player such as an Apple TV, game/entertainment system, wearable device such as a head mounted device, or other consumer electronic device). The client devices 107 and 109 can be coupled to the app store 100 by one or more networks 105, such as the Internet, which provides for the data communication between the client devices and the app store so that the client devices can send app interaction data to the app store, such as search queries, requests to download, subsequent app open events, requests to make purchases, and the like. The server(s) 101, in one embodiment, can create the data structures used in deploying the apps and providing security, and store those data structures in storage 104 for later use by server(s) 102 and 103.

In some embodiments, apps hosted on the app store 100 require additional resources separately hosted from the app package, for example on resource server 110. The resource server 110 may be comprised of one or more network devices configured to store application resources for the applications hosted on the app store 100. Many applicatoins require additional resources not built into the installation package and downloaded with the app itself. As an example, electronic games, such as games for mobile devices or other personal electronic devices, often distribute content separately from the app, such as additional game levels, skins, characters, and other content. These additional resources may be stored, for example, in storage 112. However, in some embodiments, the additional resources may be stored in the app store 100 on a separate server from the application, such as in server(s) 102 and 103.

The servers (101, 102, 103) and/or the client devices 107 and 109 can also include memory for storing, managing, and/or retrieving apps from the app store 100 including application resources. According to some embodiments, the client devices 107 and 109 may provide access to the app store 100, on which multiple applications may be hosted. Further, the client devices 107 and 109 may provide access to the resource server 110, on which additional application resources may be hosted.

Figure 2:
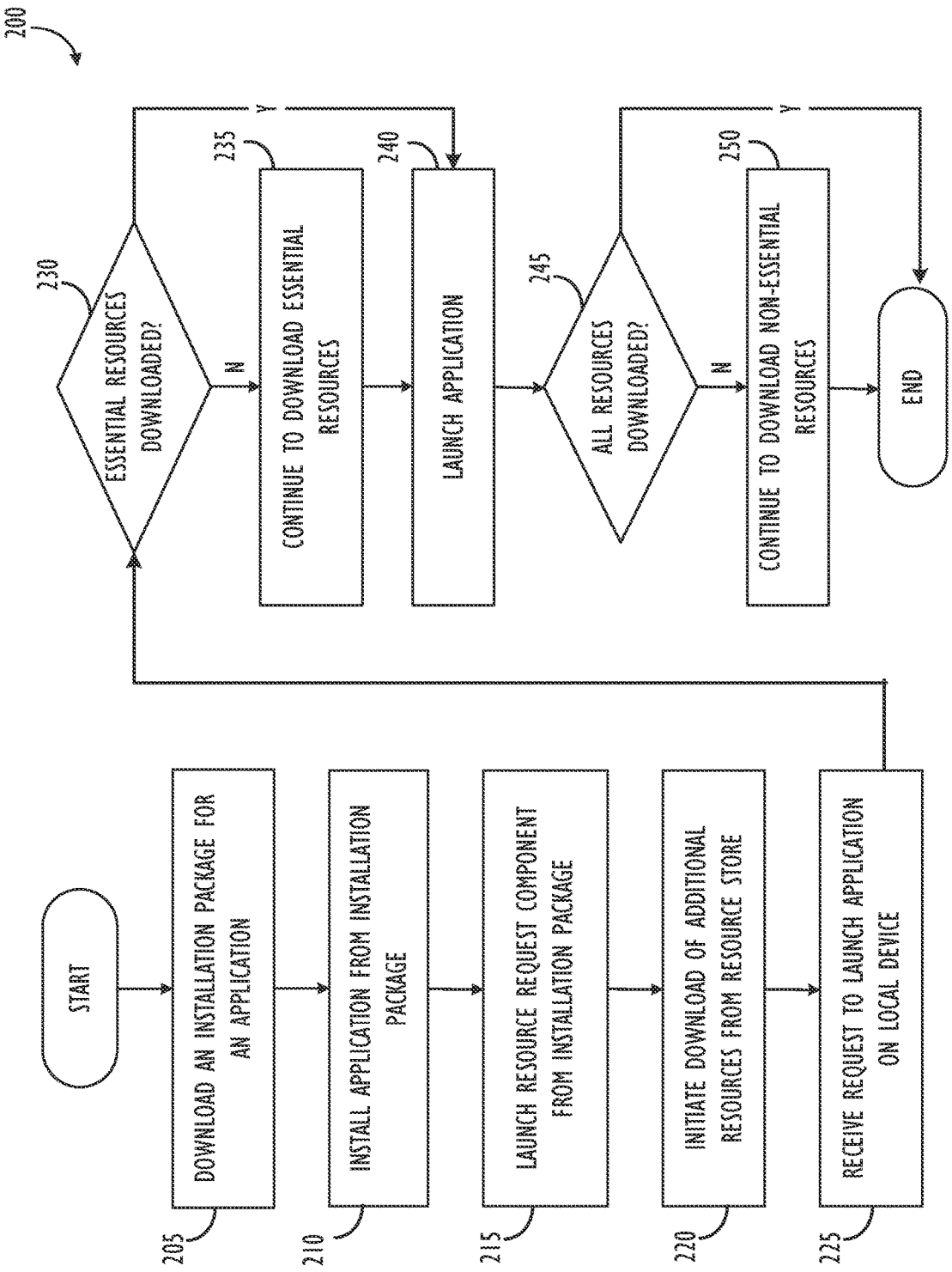
FIG. 2 illustrates, in flowchart form, a technique for installing an application on a user device, in accordance with one or more embodiments.

FIG. 2 illustrates, in flowchart form, a technique for installing an application on a user device, in accordance with one or more embodiments. Although the various actions are depicted in a particular order, in some embodiments the various actions may be performed in a different order. In still other embodiments, two or more of the actions may occur simultaneously. According to yet other embodiments, some of the actions may not be required or other actions may be included. For purposes of clarity, the flowchart will be described with respect to the various components of FIG. 1. However, it should be understood that the various actions may be taken by alternative components, according to one or more embodiments.

The flowchart 200 begins at block 205 where a client device downloads an installation package for an application. In some embodiments, a user may utilize an app store application on a client device to request download of an application from the app store 100. Then, at 210, the client device can install the application from the application package. In one or more embodiments, the application and/or the installation package includes a resource request component, for example in the form of computer code such as a separate extension. The resource request component can be configured to cause the client device to access additional resources for the application from a remote location, either directly or through another component, such as resource request API, as will be explained in greater detail below with respect to FIG. 4.

The flowchart 200 continues at block 215 where the client device launches the resource request component from the installation package. According to one or more embodiments, the resource request component includes computer code to monitor the local device for triggering conditions. Upon detecting a triggering condition, the resource request component can initiate the request for additional resources. The triggering events may include, for example, predetermined time intervals, progressive time intervals (i.e., time intervals that increase over time since the installation), installation of the application and/or application updates from the app store, and the like. Additionally, or alternatively, the triggering conditions may be user-driven, app-driven, or system-driven. For example, the triggering condition may include parameters to ensure that the download occurs when a predetermined amount of system resources is available on the client device, such as bandwidth, memory, power, and the like. As such, the resource request may be performed as a background operation without further user interaction, according to some embodiments. At block 220, the client device initiates download of additional resources from a resource store. In some embodiments, the additional resources may be downloaded from a separate location as the installation package in the app store 100, or may be downloaded from a separate device such as a resource server 110, which may be associated with the application, a set of applications, or the like.

At block 225, the client device receives a request to launch the application. In some embodiments, the resource request component can be configured to request additional resources upon download an installation of the installation package. As such, whereas in some preexisting situations, a user would not know about the existence of additional resources required to operate the application, in some embodiments described herein, the installation of the application is followed by installation of the additional resources even before the application is launched by a user, such that when the application is launched by the user, the client device has all the code, data, and other resources required to operate. Thus, at block 230, a determination is made regarding whether the client device has downloaded all essential resources from the additional resources. In some embodiments, the additional resources may include some resources that are required for operating the application, and may also include non-essential resources which are not required to be downloaded for the application to operate. The resources may be indicated as essential and nonessential, for example, in metadata in the resources, in a data structure accompanying the resources in the resource store, or the like. As such, if a determination is made that the essential resources of the additional resources have been downloaded, then the flowchart 200 continues to block 240, and the application is launched, and the user is able to utilize the application on the client device.

Returning to block 230, if a determination is made that the essential resources have not been completely downloaded, then the flowchart proceeds to block 235 and, prior to launching the application at block 240, the client device continues to download the essential resources 235. According to some embodiments, the client device can prioritize essential resources, and/or the resource server can prioritize transmission of the essential resources. In some embodiments, upon detecting launch of an application and determining that the essential resources are not completely downloaded, then the client device can transmit a request to prioritize essential resources.

The flowchart continues to block 245 where a determination is made regarding whether all resources have been downloaded upon launching the application. If all resources have been downloaded, then the flowchart concludes, and the user is able to operate the application with all available resources. Returning to block 245, if a determination is made that not all resources have been downloaded (i.e., nonessential resources remain to be downloaded), then the flowchart concludes at block 250 where the client device continues to download non-essential resources. In some embodiments, the non-essential resources can be downloaded by a background operation while a user utilizes the application. As such, download of the non-essential resources may not impact the user experience of operating the application.

Figure 3:
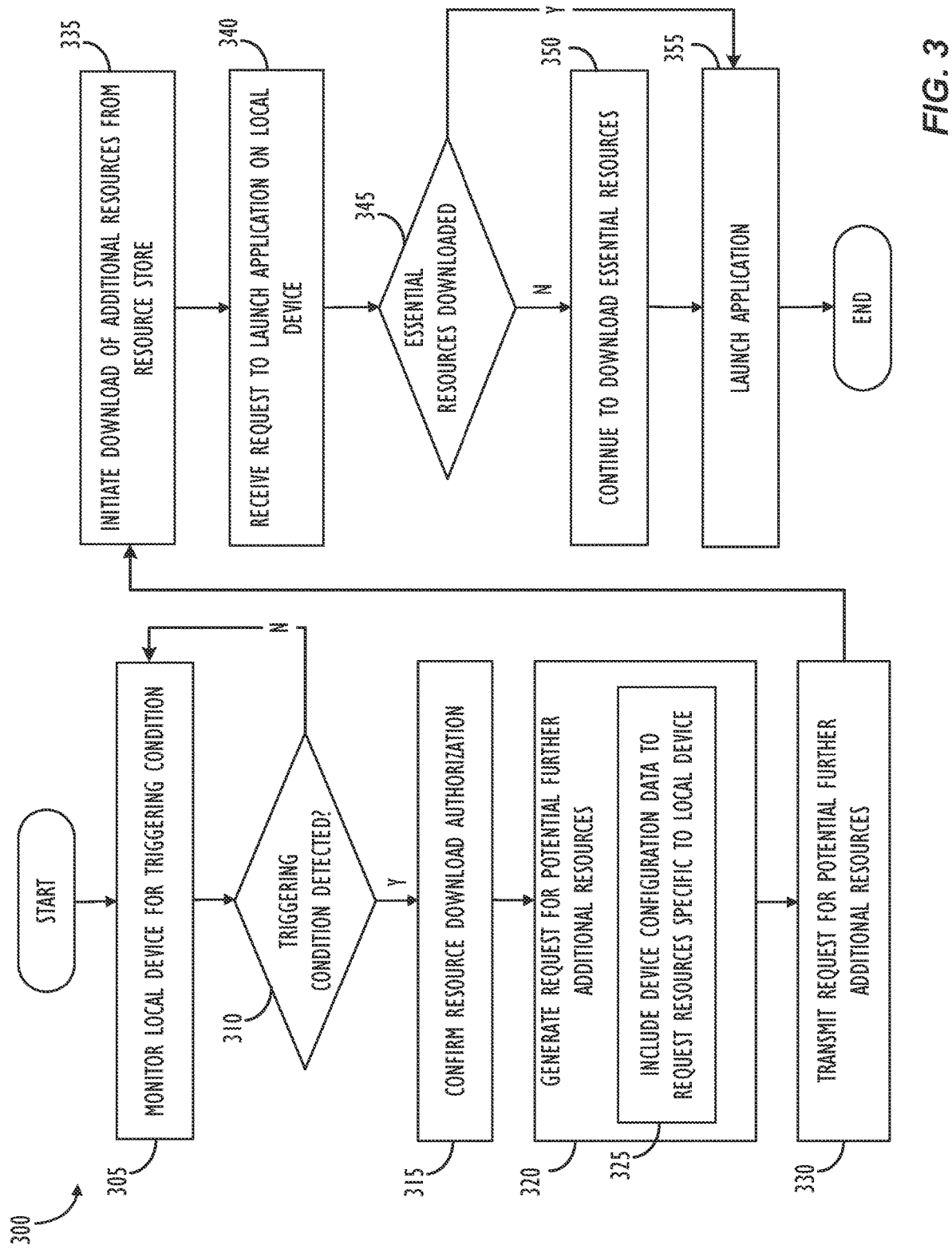
FIG. 3 illustrates, in flowchart form, a technique for updating an application installed on a user device, in accordance with one or more embodiments.

FIG. 3 illustrates, in flowchart form, a technique for updating an application installed on a user device, in accordance with one or more embodiments. Although the various actions are depicted in a particular order, in some embodiments the various actions may be performed in a different order. In still other embodiments, two or more of the actions may occur simultaneously. According to yet other embodiments, some of the actions may not be required or other actions may be included. In some embodiments, some or all of the various processes of FIG. 3 may be performed in conjunction with some or all of the processes of FIG. 4 and, thus, the separate figures are intended for clarity of explanation and do not indicate separate embodiments. For purposes of clarity, the flowchart will be described with respect to the various components of FIG. 1. However, it should be understood that the various actions may be taken by alternative components, according to one or more embodiments.

The flowchart 300 begins at block 305 where the resource request component monitors a local device for a triggering condition. In some embodiments, the resource request component can monitor for the triggering condition without executing the associated application. The triggering condition may indicate one or more parameters indicating that the resource request component should attempt to download additional resources from a remote server. The triggering events may include, for example, predetermined time intervals, progressive time intervals (i.e., time intervals that increase over time since the installation and/or the last time the application was launched), installation of the application and/or application updates from the app store, and the like. Additionally, or alternatively, the triggering conditions may be user-driven, app-driven, or system-driven. For example, the triggering condition may include parameters to ensure that the download occurs when a predetermined amount of system resources are available on the client device, such as bandwidth, memory, power, and the like. By monitoring for a triggering condition, the download of the additional resources may occur without additional user interaction, and/or may be performed by a background operation. Thus, at block 310 a determination is made regarding whether a triggering condition has occurred.

If, at block 310, a triggering condition has occurred, then the flowchart 300 proceeds to block 315, and the client device confirms resource download authorization. In some embodiments, upon downloading the resource request component, as described above with respect to FIG. 2, a user may be prompted to authorize automatic download of additional resources. Additionally, or alternatively, a user may provide global authorization for automatic download of additional resources for applications on the device for which a resource request component is available. In some embodiments, the authorization may include authorization parameters indicating conditions under which authorization is permitted. The authorization parameters may be based on characteristics of the additional resources, such as data packages that satisfy a threshold size, require a threshold bandwidth. In some embodiments, the authorization parameters may be based on system parameters, such as a current device state, resource availability, and the like.

The flowchart continues at block 320 where the client device generates a request for potential further additional resources. In some embodiments, as shown at block 325, the request may be based on device configuration data to request additional resource specific to the local device and/or configuration of the local device. For example, some app providers provide global resource packages so that a client device actually downloads more resources than are required and/or useful for the receiving device. By contrast, in current embodiments, because the request originates from the client device, the client device can request only the resources which are available for the device and/or the configuration of the device.

In some embodiments, the resource request may additionally, or alternatively, be tailored to the user and/or user profile for the application. For example, a user profile may indicate user preferences for background download of additional resources, such as only downloading essential resources, or only downloading or not downloading certain resource types (to further the example of games, new levels may be downloaded but characters may be skipped). Thus, at block 335, the client device initiates download of additional resources from a resource store (e.g., the servers 102 or 103 of resource server storage 112). In some embodiments, the download may be initiated by the resource request component, and/or may be performed in response to an API all to a resource request API which securely performs the download of the additional resources.

At block 340, the client device receives a request to launch the application. In some embodiments, the resource request component can be configured to request additional resources upon launching the application. As such, whereas in some preexisting situations, a user would not know about the existence of additional resources required to operate the application, in some embodiments described herein, the background download of the additional resources even before the application is launched by a user, such that when the application is launched by the user, the client device has all the code, data, and other resources required to operate. Thus, at block 345, a determination is made regarding whether the client device has downloaded all essential resources from the additional resources. In some embodiments, the additional resources may include some resources that are required for operating the application, and may also include non-essential resources which are not required to be downloaded for the application to operate. The resources may be indicated as essential and nonessential, for example, in metadata in the resources, in a data structure accompanying the resources in the resource store, or the like. As such, if a determination is made that the essential resources of the additional resources have been downloaded, then the flowchart 300 continues to block 355, and the application is launched, and the user is able to utilize the application on the client device.

Returning to block 345, if a determination is made that the essential resources have not been completely downloaded, then the flowchart proceeds to block 350 and, prior to launching the application at block 355, the client device continues to download the essential resources 350. According to some embodiments, the client device can prioritize essential resources, and/or the resource server can prioritize transmission of the essential resources. In some embodiments, upon detecting launch of an application and determining that the essential resources are not completely downloaded, then the client device can transmit a request to prioritize essential resources. In some embodiments, the non-essential resources can be downloaded by a background operation while a user utilizes the application. As such, download of the non-essential resources may not impact the user experience of operating the application.

In some embodiments, various techniques described in FIGS. 2-3 can be performed in various permutations. For example, in some embodiments, the initial download of an application in FIG. 2 may include an authorization step, as described with respect to FIG. 3. As another example, the initial download of additional resources as described at 220 may be requested to include device configuration data or other data such that the requested additional resources are tailored to the requesting device, as described with respect to FIG. 3. Similarly, other features may be provided in various components.

Moreover, it should be understood that in some embodiments, not all processes described in the figures may be necessary. As an example, embodiments described herein may not include a determination as to whether essential resources are downloaded as described at 230 and 345. Similarly, embodiments described herein may not include continuing to download non-essential resources as described at 250.

Figure 4:
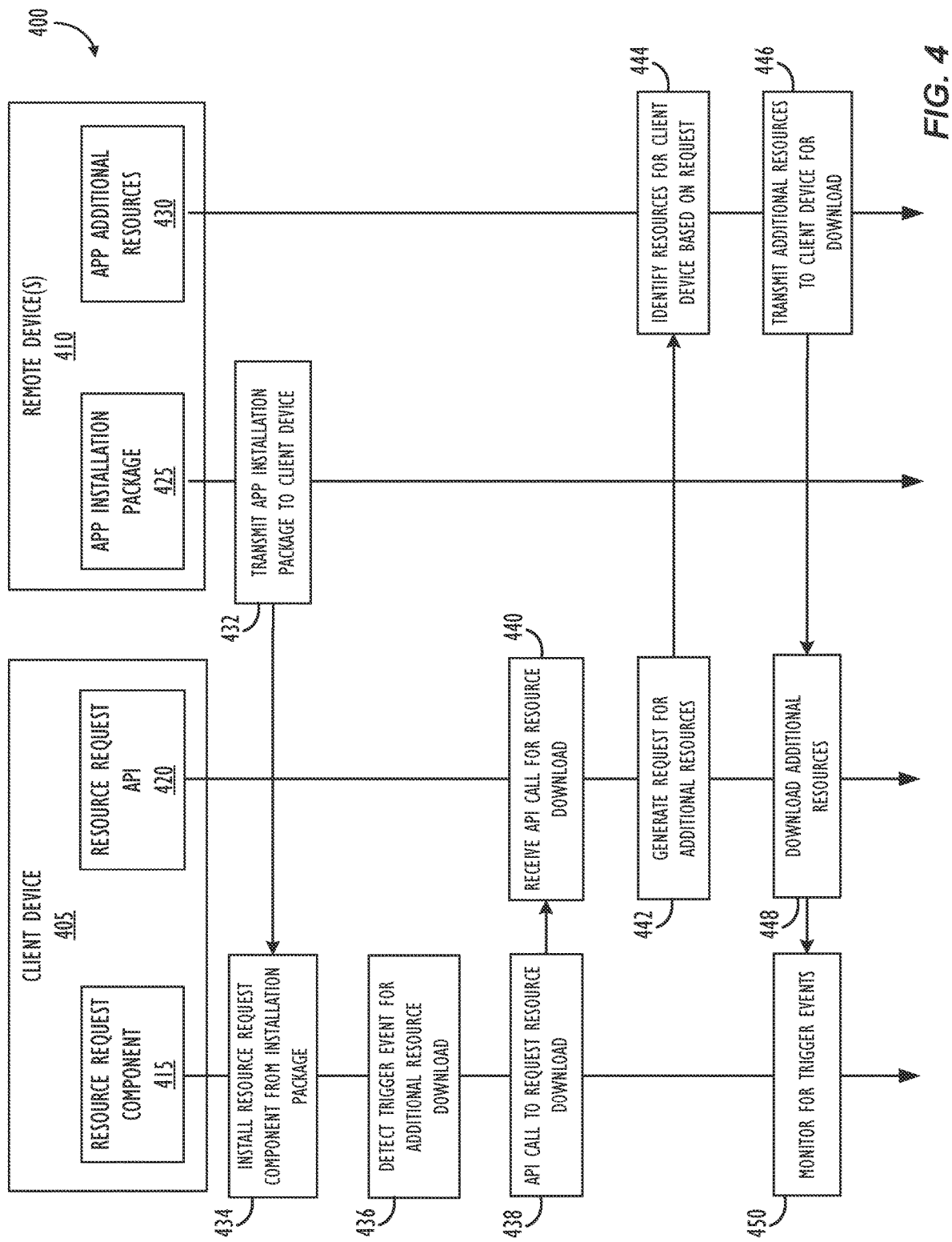
FIG. 4 illustrates a flow diagram of a technique for accessing additional resources from a remote device, in accordance with one or more embodiments.

FIG. 4 illustrates a flow diagram of a technique for accessing additional resources from a remote device, in accordance with one or more embodiments. In particular, FIG. 4 illustrates an example data flow between a client device 405 and one or more remote device 410 on which an app installation package 425 and additional resources 430 are hosted. It should be understood that the particular flow and components presented with respect to FIG. 4 merely refer to an example embodiment and are not intended to limit the disclosure provided herein.

The flow diagram 400 begins at 432 where the remote device transmits an app installation package to the client device 405. In some embodiments, the app installation package may be transmitted in response to a user request, for example, in an app store application running on client device 405. The application package may include the application along with a resource request component 415 for the application. The resource request component 415 may be provided in the form of computer code such as a separate extension. The resource request component can be configured to cause the client device to access additional resources for the application from a remote location, either directly or through another component, such as resource request API 420. For example, the resource request component 415 provided by the app developer, and may be allowed to make calls to a resource request API 420 on the client device 405, which handles download of additional resources in a manner that is secure.

Figure 5:
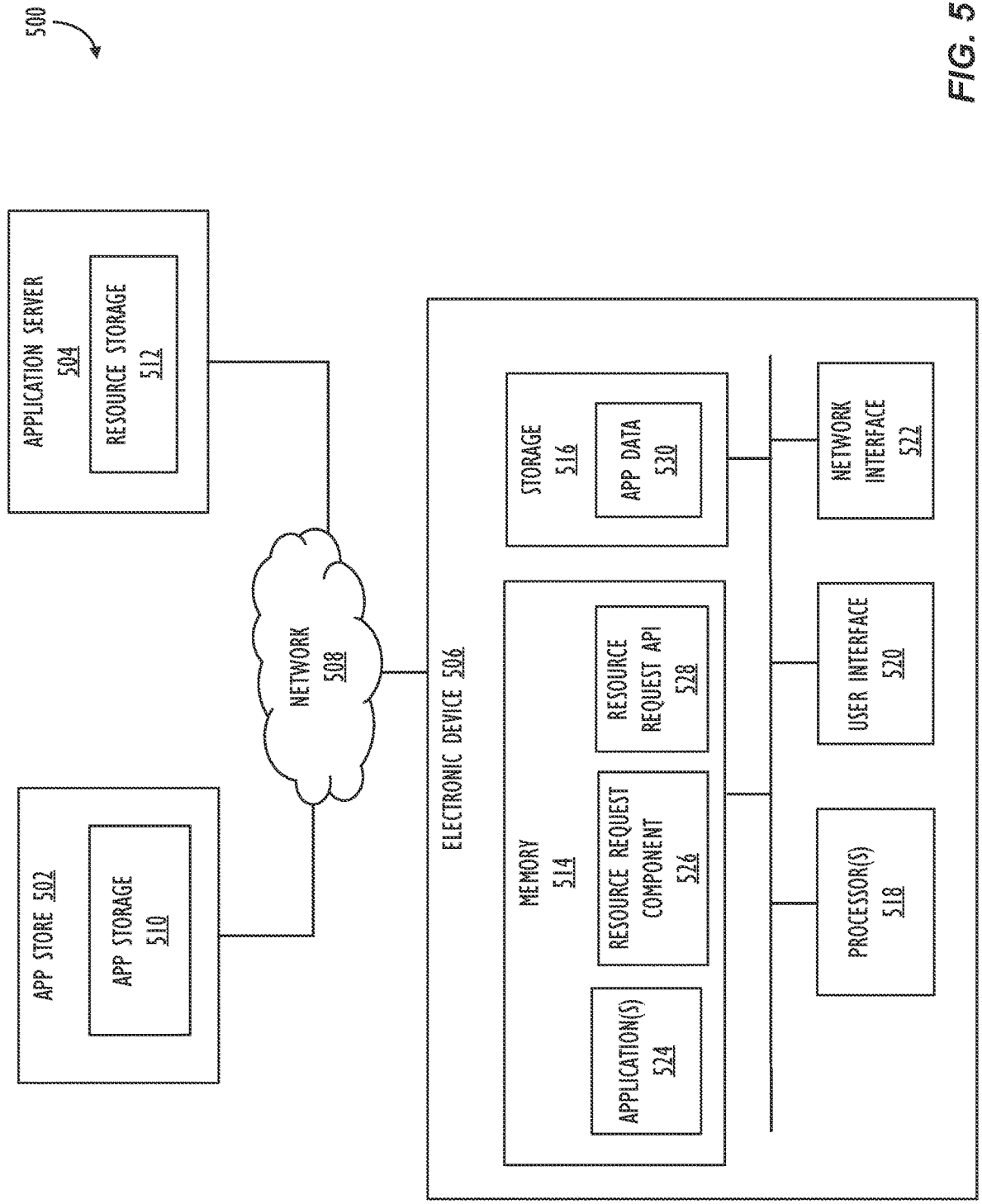
FIG. 5 illustrates an example network diagram in accordance with one or more embodiments.

At 436, the resource request component 415 detects a trigger event for additional resource download. As described, above, the triggering event may include, for example, predetermined time intervals, progressive time intervals (i.e., time intervals that increase over time since the installation), installation of the application and/or application updates from the app store, and the like. Additionally, or alternatively, the triggering conditions may be user-driven, app-driven, or system-driven. For example, the triggering condition may include parameters to ensure that the download occurs when a predetermined amount of system resources are available on the client device, such as bandwidth, memory, power, and the like. FIG. 5 illustrates an example network diagram in accordance with one or more embodiments.

In response to detecting a trigger event, at block 438, the resource request component may make a call to the resource request API 420. In some embodiments, the resource request component 415 may be configured to call the resource request API 420 such that the resource request API 420 can perform the download of the additional resources 430 from the remote device 430.

The resource request API receives the API call at block 440. The resource request API may ensure a secure download of the additional resources. For example, as described above, the resource request API 420 may ensure authorization prior to download. In some embodiments, the API may further ensure security through additional techniques, such as confirming that the server being accessed for downloading the additional resources is indicated by the corresponding application, for example in the application's metadata. As another example, the amount of data in the download of the additional resources may be indicated by the associated application on the client device 405. At 442, the resource request API 420 generates the request accordingly, and transmits the request to the remote device 410 on which the additional resources 430 are hosted. In response, at 446, the remote device 410 transmits the additional resource to the client device for download, so that at 448, the resource request API can download the additional resources. The flow diagram concludes at 450 the resource request component 415 continues to monitor for triggering events.

FIG. 5 illustrates, in block diagram form, a network diagram 500 in which app-independent resource downloads are provided, according to one or more embodiments. Although the various processes and components are presented in a particular configuration, in some embodiments the components may be differently distributed across the devices shown, or across additional devices. Further, in some embodiments, some components may be combined, or additional components may be provided.

In some embodiments, the electronic device 506, app store 502, and application server 504 are communicably connected across a network 508. Network 580 may include, for example, the internet, a wide area network, a local area network, or the like, or any combination thereof. Electronic device 506 can take a variety of different forms (e.g., tablet computer such as an iPad, smartphone such as an iPhone, laptop computer, desktop computer, network media player such as an Apple TV, game/entertainment system, wearable devices such as a head mounted device, watch, or the like, or other consumer electronic device).

According to one or more embodiments, electronic device 506 may be a consumer device configured to run one or more programming modules, such as applications 524, as well as other executable components, such as resource request component 526, and resource request API 528. The programming modules are processed by one or more processor(s) 518 from a memory 514. Processor(s) 518 may include one or more different kinds of processors, such as a central processing unit (CPU), graphical processing unit (GPU), and the like. In some embodiments, processor(s) 518 may be a system-on-chip. Memory 514 may include memory cache, read-only memory (ROM), and/or random-access memory (RAM).

Storage 516 may store suitable data for executing the programming modules, such as app data 530 and other data. Storage 516 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Electronic device 506 may include a user interface 520 through which a user can interact with the programmable modules, such as application(s) 524. The user interface 520 can include input components, display components, audio components, and the like. Electronic device 506 also includes a network interface 522, over which the electronic device connects to other devices across network 508.

The electronic device 506 may be connected to the app store 502 across the network 508. According to some embodiments, the application(s) 524 and the resource request component 526 may be downloaded from the app store 502. In particular, in some embodiments, the application(s) 524 and the resource request component 526 may be hosted in app storage 510 in the app store 502.

The electronic device 506 may additionally be connected to the application server 504 across the network 508. According to one or more embodiments, resource request component 526 may request additional resources for an application (such as application(s) 524) that are stored separately from the application. For example, the resource request component 528 may trigger a request to download additional application resources from resource storage 512 on the application server 504, either directly, or though resource request API 528.

Figure 6:
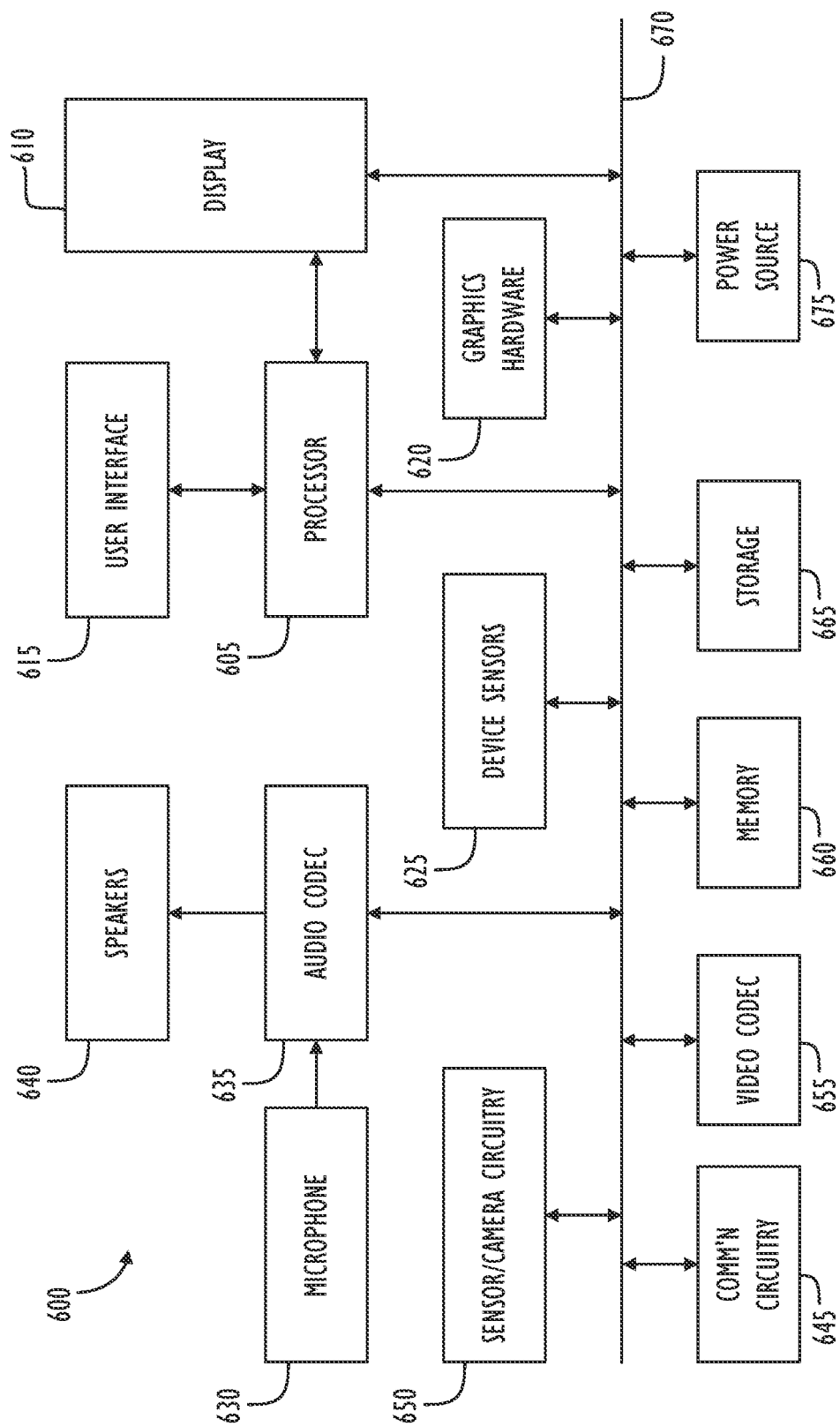
FIG. 6 illustrates a simplified functional block diagram of an illustrative programmable electronic device, in accordance with an embodiment.

Referring now to FIG. 6, a simplified functional block diagram of an illustrative programmable electronic device 600 for providing access to an app store is shown, according to one embodiment. Electronic device 600 could be, for example, a mobile telephone, personal media device, portable camera, or a tablet, notebook or desktop computer system. As shown, electronic device 600 may include processor 605, display 610, user interface 615, graphics hardware 620, device sensors 625 (e.g., proximity sensor/ambient light sensor, accelerometer and/or gyroscope), microphone 630, audio codec(s) 635, speaker(s) 640, communications circuitry 645, image capture circuit or unit 650, which may, e.g., comprise multiple camera units/optical sensors having different characteristics (as well as camera units that are housed outside of, but in electronic communication with, device 600), video codec(s) 655, memory 660, storage 665, and communications bus 670.

Processor 605 may execute instructions necessary to carry out or control the operation of many functions performed by device 600 (e.g., such as the download of applications and/or additional resources in accordance with the various embodiments described herein). Processor 605 may, for instance, drive display 610 and receive user input from user interface 615. User interface 615 can take a variety of forms, such as a button, keypad, dial, a click wheel, keyboard, display screen and/or a touch screen. User interface 615 could, for example, be the conduit through which a user may view a captured video stream and/or indicate particular images(s) that the user would like to capture or share (e.g., by clicking on a physical or virtual button at the moment the desired image is being displayed on the device's display screen).

In one embodiment, display 610 may display a video stream as it is captured while processor 605 and/or graphics hardware 620 and/or image capture circuitry contemporaneously store the video stream (or individual image frames from the video stream) in memory 660 and/or storage 665. Processor 605 may be a system-on-chip such as those found in mobile devices and include one or more dedicated graphics processing units (GPUs). Processor 605 may be based on reduced instruction-set computer (RISC) or complex instruction-set computer (CISC) architectures or any other suitable architecture and may include one or more processing cores. Graphics hardware 620 may be special purpose computational hardware for processing graphics and/or assisting processor 605 perform computational tasks. In one embodiment, graphics hardware 620 may include one or more programmable graphics processing units (GPUs).

Image capture circuitry 650 may comprise one or more camera units configured to capture images, e.g., in accordance with this disclosure. Output from image capture circuitry 650 may be processed, at least in part, by video codec(s) 655 and/or processor 605 and/or graphics hardware 620, and/or a dedicated image processing unit incorporated within circuitry 650. Images so captured may be stored in memory 660 and/or storage 665. Memory 660 may include one or more different types of media used by processor 605, graphics hardware 620, and image capture circuitry 650 to perform device functions. For example, memory 660 may include memory cache, read-only memory (ROM), and/or random-access memory (RAM). Storage 665 may store media (e.g., audio, image and video files), computer program instructions or software, preference information, device profile information, and any other suitable data. Storage 665 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 660 and storage 665 may be used to retain computer program instructions or code organized into one or more modules and written in any desired computer programming language. When executed by, for example, processor 605, such computer program code may implement one or more of the methods described herein. Power source 675 may comprise a rechargeable battery (e.g., a lithium-ion battery, or the like) or other electrical connection to a power supply, e.g., to a mains power source, that is used to manage and/or provide electrical power to the electronic components and associated circuitry of electronic device 600.

In the foregoing description, numerous specific details are set forth, such as specific configurations, properties, and processes, etc., in order to provide a thorough understanding of the embodiments. In other instances, well-known processes and manufacturing techniques have not been described in particular detail in order to not unnecessarily obscure the embodiments. Reference throughout this specification to "one embodiment," "an embodiment," "another embodiment," "other embodiments," "some embodiments," and their variations means that a particular feature, structure, configuration, or characteristic described in connection with the embodiment is included in at least one embodiment. Thus, the appearances of the phrase "for one embodiment," "for an embodiment," "for another embodiment," "in other embodiments," "in some embodiments," or their variations in various places throughout this specification are not necessarily referring to the same embodiment. Furthermore, the particular features, structures, configurations, or characteristics may be combined in any suitable manner in one or more embodiments.

In the following description and claims, the terms "coupled" and "connected," along with their derivatives, may be used. It should be understood that these terms are not intended as synonyms for each other. "Coupled" is used herein to indicate that two or more elements or components, which may or may not be in direct physical or electrical contact with each other, co-operate or interact with each other. "Connected" is used to indicate the establishment of communication between two or more elements or components that are coupled with each other.

Some portions of the preceding detailed description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing system, that manipulates and transforms data represented as physical (electronic) quantities within the computer system's registers and memories into other data similarly represented as physical quantities within the computer system memories or registers or other such information storage, transmission or display devices.

Embodiments described herein can relate to an apparatus for performing a computer program (e.g., the operations described herein, etc.). Such a computer program may be stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

Although operations or methods are described above in terms of some sequential operations, it should be appreciated that some of the operations described may be performed in a different order. Moreover, some operations may be performed in parallel, rather than sequentially. Embodiments described herein are not described with reference to any particular programming language. It will be appreciated that a variety of programming languages may be used to implement the various embodiments of the disclosed subject matter. In utilizing the various aspects of the embodiments described herein, it would become apparent to one skilled in the art that combinations, modifications, or variations of the above embodiments are possible for managing components of a processing system to increase the power and performance of at least one of those components. Thus, it will be evident that various modifications may be made thereto without departing from the broader spirit and scope of at least one of the disclosed concepts set forth in the following claims. The specification and drawings are, accordingly, to be regarded in an illustrative sense, rather than a restrictive sense.

In the development of any actual implementation of one or more of the disclosed concepts (e.g., such as a software and/or hardware development project, etc.), numerous decisions must be made to achieve the developers' specific goals (e.g., compliance with system-related constraints and/or business-related constraints). These goals may vary from one implementation to another, and this variation could affect the actual implementation of one or more of the disclosed concepts set forth in the embodiments described herein. Such development efforts might be complex and time-consuming, but may still be a routine undertaking for a person having ordinary skill in the art in the design and/or implementation of one or more of the inventive concepts set forth in the embodiments described herein.

As used in the description above and the claims below, the phrases "at least one of A, B, or C" and "one or more of A, B, or C" include A alone, B alone, C alone, a combination of A and B, a combination of B and C, a combination of A and C, and a combination of A, B, and C. That is, the phrases "at least one of A, B, or C" and "one or more of A, B, or C" means A, B, C, or any combination thereof, such that one or more of a group of elements consisting of A, B and C, and should not be interpreted as requiring at least one of each of the listed elements A, B and C, regardless of whether A, B and C are related as categories or otherwise. Furthermore, the use of the article "a" or "the" in introducing an element should not be interpreted as being exclusive of a plurality of elements. Also, the recitation of "A, B, and/or C" is equal to "at least one of A, B, or C." Also, the use of "a" refers to "one or more" in the present disclosure. For example, "an application" refers to "one application" or "a group of applications."

What is claimed is:

1. A non-transitory computer readable medium comprising computer readable code executable by one or more processors to:
   download, to a local device from a digital distribution platform comprising one or more storage devices, an installation package for an application, wherein the installation package comprises a resource request component; and
   in response to installing the application, launch the resource request component, wherein the resource request component causes the local device to:
      transmit a request to a resource server for additional resources for the application, wherein the resource server is separate from the digital distribution platform,
      download the additional resources to the local device from the resource server, wherein the additional resources comprise a set of resources, and an indication as to whether each of the set of resources is an essential resource, or a non-essential resource, and
   in response to receiving a request to launch the application on the local device:
      launch the application in response to a determination that all essential resources are downloaded from the additional resources, wherein the application is operable upon download of the essential resources, and wherein the non-essential resources affect a mode of the application.

2. The non-transitory computer readable medium of claim 1, further comprising computer readable code to:
   continue to download the non-essential resources upon launching the application.

3. The non-transitory computer readable medium of claim 1, wherein the installation package is downloaded from a first remote source, and the resource server is comprised in a second remote source.

4. The non-transitory computer readable medium of claim 1, wherein the request for the additional resources comprises local device configuration data, and
   wherein the additional resources downloaded comprise a subset of available additional resources in accordance with the local device configuration data.

5. The non-transitory computer readable medium of claim 1, further comprising computer readable code to:
   detect, at the local device, a triggering condition, and in accordance with detecting the triggering condition, transmit a request to the resource server for further additional resources, and download the further additional resources.

6. The non-transitory computer readable medium of claim 5, wherein the computer readable code to launch the resource request component further comprises computer readable code to:

present an authorization request to a user to authorize automatic resource downloads for the application, the request is transmitted to the resource server for further additional resources in accordance with an affirmative response to the authorization request.

7. A method comprising:

downloading, to a local device from a digital distribution platform comprising one or more storage devices, an installation package for an application, wherein the installation package comprises a resource request component; and in response to installing the application, launch the resource request component, wherein the resource request component causes the local device to:

transmitting a request to a resource server for additional resources for the application, wherein the resource server is separate from the digital distribution platform, downloading the additional resources to the local device from the resource server, wherein the additional resources comprise a set of resources, and an indication as to whether each of the set of resources is an essential resource, or a non-essential resource, and in response to receiving a request to launch the application on the local device:

launching the application in response to a determination that all essential resources are downloaded from the additional resources, wherein the application is operable upon download of the essential resources, and wherein the non-essential resources affect a mode of the application.

8. The method of claim 7, further comprising:

continuing to download the non-essential resources upon launching the application.

9. The method of claim 7, wherein the installation package is downloaded from a first remote source, and the resource server is comprised in a second remote source.

10. The method of claim 7, wherein the request for the additional resources comprises local device configuration data, and wherein the additional resources downloaded comprise a subset of available additional resources in accordance with the local device configuration data.

11. The method of claim 7, further comprising:

detecting, at the local device, a triggering condition, and in accordance with detecting the triggering condition, transmitting a request to the resource server for further additional resources, and downloading the further additional resources.

12. The method of claim 11, wherein launching the resource request component further comprises:

presenting an authorization request to a user to authorize automatic resource downloads for the application, wherein the request is transmitted to the resource server for further additional resources in accordance with an affirmative response to the authorization request.

13. A system comprising:

one or more processors; and one or more computer readable media comprising computer readable code executable by the one or more processors to:

download, to a local device from a digital distribution platform comprising one or more storage devices, an installation package for an application, wherein the installation package comprises a resource request component; and in response to installing the application, launch the resource request component, wherein the resource request component causes the local device to:

transmit a request to a resource server for additional resources for the application, wherein the resource server is separate from the digital distribution platform, download the additional resources to the local device from the resource server, wherein the additional resources comprise a set of resources, and an indication as to whether each of the set of resources is an essential resource, or a non-essential resource, and in response to receiving a request to launch the application on the local device:

launch the application in response to a determination that all essential resources are downloaded from the additional resources, wherein the application is operable upon download of the essential resources, and wherein the non-essential resources affect a mode of the application.

14. The system of claim 9, further comprising computer readable code to:

continue to download the non-essential resources upon launching the application.

15. The system of claim 13, wherein the installation package is downloaded from a first remote source, and the resource server is comprised in a second remote source.

16. The system of claim 13, wherein the request for the additional resources comprises local device configuration data, and wherein the additional resources downloaded comprise a subset of available additional resources in accordance with the local device configuration data.

17. The system of claim 13, further comprising computer readable code to:

detect, at the local device, a triggering condition, and in accordance with detecting the triggering condition, transmit a request to the resource server for further additional resources, and download the further additional resources.

* * * * *

UNITED STATES PATENT AND TRADEMARK OFFICE
CERTIFICATE OF CORRECTION

| | | |
|---|---|---|
| PATENT NO. | : 12,489,830 B2 | Page 1 of 1 |
| APPLICATION NO. | : 17/805461 | |
| DATED | : December 2, 2025 | |
| INVENTOR(S) | : Eric S. Brown et al. | |

It is certified that error appears in the above-identified patent and that said Letters Patent is hereby corrected as shown below:

In the Claims

Claim 6, Column 13, Line 11: insert the word -- wherein -- before the words -- the request --

Signed and Sealed this
Thirtieth Day of December, 2025

John A. Squires
*Director of the United States Patent and Trademark Office*